Sept. 19, 1967 R. J. ROGERS 3,343,128

ELECTROLUMINESCENT PANEL DRIVER CIRCUITS

Filed June 27, 1963 5 Sheets-Sheet 1

INVENTOR.
RAYMOND J. ROGERS
BY
ATTORNEY

ELECTROLUMINESCENT PANEL DRIVER CIRCUITS

Filed June 27, 1963 5 Sheets-Sheet 2

Sept. 19, 1967 R. J. ROGERS 3,343,128

ELECTROLUMINESCENT PANEL DRIVER CIRCUITS

Filed June 27, 1963 5 Sheets-Sheet 3

ELECTROLUMINESCENT PANEL DRIVER CIRCUITS

Filed June 27, 1963 5 Sheets-Sheet 4

ELECTROLUMINESCENT PANEL DRIVER CIRCUITS

Filed June 27, 1963 5 Sheets-Sheet 5

Patented Sept. 19, 1967

3,343,128

ELECTROLUMINESCENT PANEL DRIVER CIRCUITS

Raymond J. Rogers, Rochester, N.Y., assignor to General Dynamics Corporation, Rochester, N.Y., a corporation of Delaware
Filed June 27, 1963, Ser. No. 291,109
7 Claims. (Cl. 340—166)

This invention relates to circuitry for selectively exciting a crossed-grid electroluminescent display panel and, more particularly, to means for eliminating light emission along the selected lines of an electroluminescent panel at points other than the crossover point of selected lines.

Electroluminescent display panels of the X–Y coordinate type are known which include a plurality of horizontal and vertical lines which form a crossed-grid of two sets of conductors electrically insulated from each other and positioned on opposite sides of a layer of electroluminescent material. Such panels operate to produce a visible glow in the region of crossover of a pair of selected X and Y lines when said selected lines are subjected to a suitable time varying potential difference.

In prior devices, the row and column selected will glow along the entire length unless means are provided to suppress luminescence in the region along the selected X and Y lines other than the crossover region itself. For example, when the voltages on the X and Y lines are equal in magnitude, but of inverse polarity, one-half of the voltage will also be applied to the entire row and column selected and each selected X and Y line emits some light along its entire length with the intersection of the two lines being somewhat brighter. This half-voltage visible emission along the selected lines is undesirable in most applications and results in a poor discrimination ratio for the visual display. This invention is directed to an effective technique for suppressing the visible glow along the selected X and Y lines at points other than the desired crossover point.

In the subject invention, means are provided for applying suppression pulses to all drivers used to excite unselected Y lines, thereby altering the output at the unselected Y likes in such a manner than the potential difference existing at the crossovers of unselected Y lines and a selected X line is one-third of the potential difference occurring at the crossover of the selected X and Y lines. Furthermore, there is no output voltage on the unselected X line drivers; consequently, the potential difference at the crossovers of the unselected X lines and the selected Y line is one-third that existing at the crossover of selected X and Y lines.

Each of the X and Y lines is coupled to a corresponding X and Y line driver. The Y line driver corresponding to the Y line to be selected at any given instant is supplied with a Y selection gating pulse; likewise, the X line driver corresponding to the X line to be selected is supplied with an X selection gate. The remaining Y drivers, which are not receptive of a gating pulse, provide output voltages to the Y lines which differ from those supplied to the selected Y lines by their associated drivers. The X line drivers, which do not receive a gating pulse, do not provide an output.

In a first embodiment of the invention, each Y line driver includes a single grounded emitter-transistor which normally, in the absence of a Y selection gate, is prevented from receiving excitation pulses. In the absence of such excitation pulses, these transistors are cut off and represent a high output impedance in series with a suppression pulsating voltage referenced at the collector supply voltage. This supply voltage may be either positive or negative relative to the grounded emitter, depending upon whether N–P–N or P–N–P transistors, respectively, are used. If it be assumed that the supply voltage is positive relative to ground and that an N-P-N transistor is used, a suppression voltage thus appears at the collector (output) of these transistors which is a positive pulse. Each X line driver includes a grounded emitter-transistor which, in the absence of an X selection gate, is prevented from receiving excitation pulses. Consequently, these transistors are cut off and only the collector supply voltage appears at the output of these transistors. In other words, there is no pulse at the output of these transistors. During the period of a Y selection gate, excitation pulses are supplied to the corresponding Y line driver and the transistor associated therewith is driven into and out of conduction thereby. During conduction, the impedance of this transistor is so low that substantially none of the suppression voltage appears at its collector. The output of the selected Y transistor during conduction thus is a pulse fluctuating between the collector supply potential and zero and is, therefore, a negative pulse. During arrival of an X selection gate, the selected transistor is receptive of excitation pulses and is switched thereby into and out of conduction. The collector voltage than fluctuates between the collector supply potential and zero volts. This output voltage then is a positive pulse. If the collector potential of the X transistor is made twice that of the Y transistors, the net voltage at the crossover of the selected X and Y lines is three times the net voltage at all other crossover points. Thus, electroluminescene at other than the selected crossover point is prevented.

The collector supply voltage may be made negative relative to ground and the Y transistors of the P-N-P type, in which case, the suppression voltage appearing at the output of the Y transistors for the unselected Y line drivers would be a negative pulse. Likewise, the output of the selected Y transistor would fluctuate between the negative direct current electric potential and zero and would be a positive pulse. The 3:1 relationship in voltages, previously mentioned, still applies, however.

In another embodiment of the invention, each Y line driver includes an excitation transformer in the collector circuit; the primary winding of this transformer is supplied with positive excitation pulses. The secondary winding of this excitation transformer is connected in series with the secondary winding of a suppression transformer common to all Y line drivers. The net voltage in the two serially-connected transformer secondaries is supplied to the associated Y line of an eletcroluminescent panel. Normally, the transistors of the unselected Y line drivers are biased off, thereby presenting a high impedance in circuit with the primary winding of the associated excitation transformer. Consequently, substantially none of the excitation voltage appears across the excitation transformer primary and no voltage is induced in the secondary thereof. Since the secondary of the excitation transformer is relatively a low impedance, practically all the suppression voltage appears at the unselected Y lines.

In the absence of a gating pulse, the net voltage is a positive suppression pulsating voltage of $n$ volts induced in the secondary of the suppression transformer by incoming suppression pulses. When a Y gate pulse arrives, it causes the transistor of the selected Y line driver to conduct and the transistor now represents a low impedance in circuit with the primary of its associated excitation transformer. Hence, substantially the entire excitation voltage appears across the primary winding of the excitation transformer and a negative pulse of $2n$ volts is induced in the secondary winding. This negative pulse is in series with the positive pulse of $n$ volts in the secondary of the suppression transformer and provides a net output pulse of $-n$ volts to the selected Y line of the electroluminescent panel. The X line drivers may be identical to those of the first embodiment, wherein a positive voltage of $2n$ volts is derived at the output of the selected X line driver during the presence of an X selection gate. The net voltage at the crossover of the selected X and Y lines is then the difference between $+2n$ volts and $-n$ volts or $3n$ volts. The net voltage at the crossover of a selected line and the unselected lines for the other axis of the panel is only $+n$ or $-n$ volts.

In still another embodiment of the invention, the Y excitation and X excitation pulses are no longer in coincidence, but are timed so that the leading edge of the excitation pulse on the X line begins to rise as the trailing edge of the excitation pulse on the Y line begins to fall, or vice versa. In this embodiment, each Y line driver includes a pair of transistors, one of which is rendered conducting during the presence of a Y gating pulse, whereupon the voltage drop in the collector circuit acts to block suppression pulses from the base of the other (or output) transistor. The Y gating pulse further allows excitation pulses occurring during the gate period in time slot No. 1 to switch the output transistor of the selected Y driver into and out of conduction. The collector or output circuit of the output transistor is referenced at $+n$ volts. During conduction of the output transistor, pulses fluctuating from $+n$ volts to zero are derived, that is, negative pulses of $n$ volts amplitude occurring during time slot No. 1 are derived from the selected Y output transistor. In the absence of a Y gating pulse, the first transistors of the unselected Y line drivers are biased off, permitting suppression pulses to be applied to the base of the corresponding output transistors. Furthermore, the excitation pulses are prevented from reaching the output transistors of the unselected Y drivers by means of diode switching. The application of the suppression pulses, which occur in time slot No. 2, switches the output transistors of the unselected Y drivers into and out of conduction, thereby producing negative pulses of $n$ volts which occur during time slot No. 2.

The X line drivers may be identical to those of the second embodiment mentioned above; that is, excitation pulses occurring during time slot No. 2 are supplied to the transistor of a selected X line driver during the X gating period to render the selected transistors conducting. During conduction, the voltage at the collector or output circuit of the selected X transistor fluctuates between zero and $2n$ volts, or, consists of negative pulses referenced at $+2n$ volts. In the absence of an X gating pulse, the unselected X transistors are biased off and no pulses derive at the output thereof. In the case of a selected X line and a selected Y line, there exists a negative pulse of $2n$ volts during time slot No. 2 and a negative pulse of $n$ volts in time slot No. 1. This means that the negative-going edge of the $-2n$ volt pulse substantially coincides with the positive edge of the negative $n$ volt pulse, or vice versa. The difference in voltage at the crossover of the selected X and Y lines, consequently, is $3n$ volts. In the case of a selected X line and unselected Y lines, there exists a negative voltage of $2n$ volts in time slot No. 2 and a negative $n$ volt pulse in time slot No. 2. The difference in voltage at the crossovers of a selected X line and unselected Y lines then is only $n$ volts and no luminescence can occur. In the case of a selected Y line and unselected X line, there exists a negative $n$ volt pulse and no pulse, respectively. Consequently, the voltage at the crossovers of a selected Y line and unselected X lines is only $n$ volts and, again, no luminescence can occur.

Other objects, features and advantages of this invention will become apparent as the following description proceeds and the features of novelty which characterize the invention will be pointed out with particularity in the claims annexed to and forming a part of this specification and drawings, in which:

Figure 1:
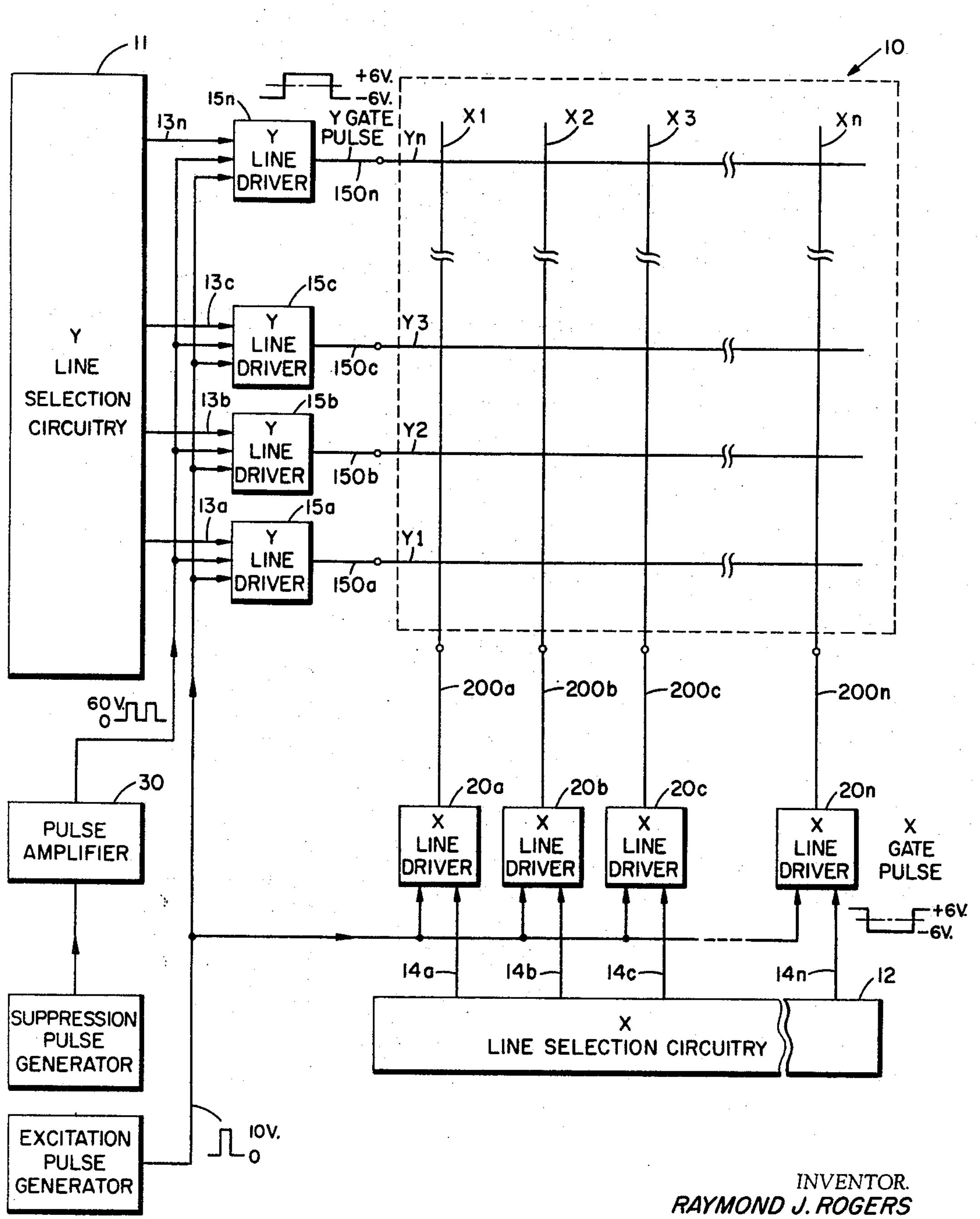
FIG. 1 is a block diagram showing the general details of a device in accordance with the invention.
Figures 2, 3:
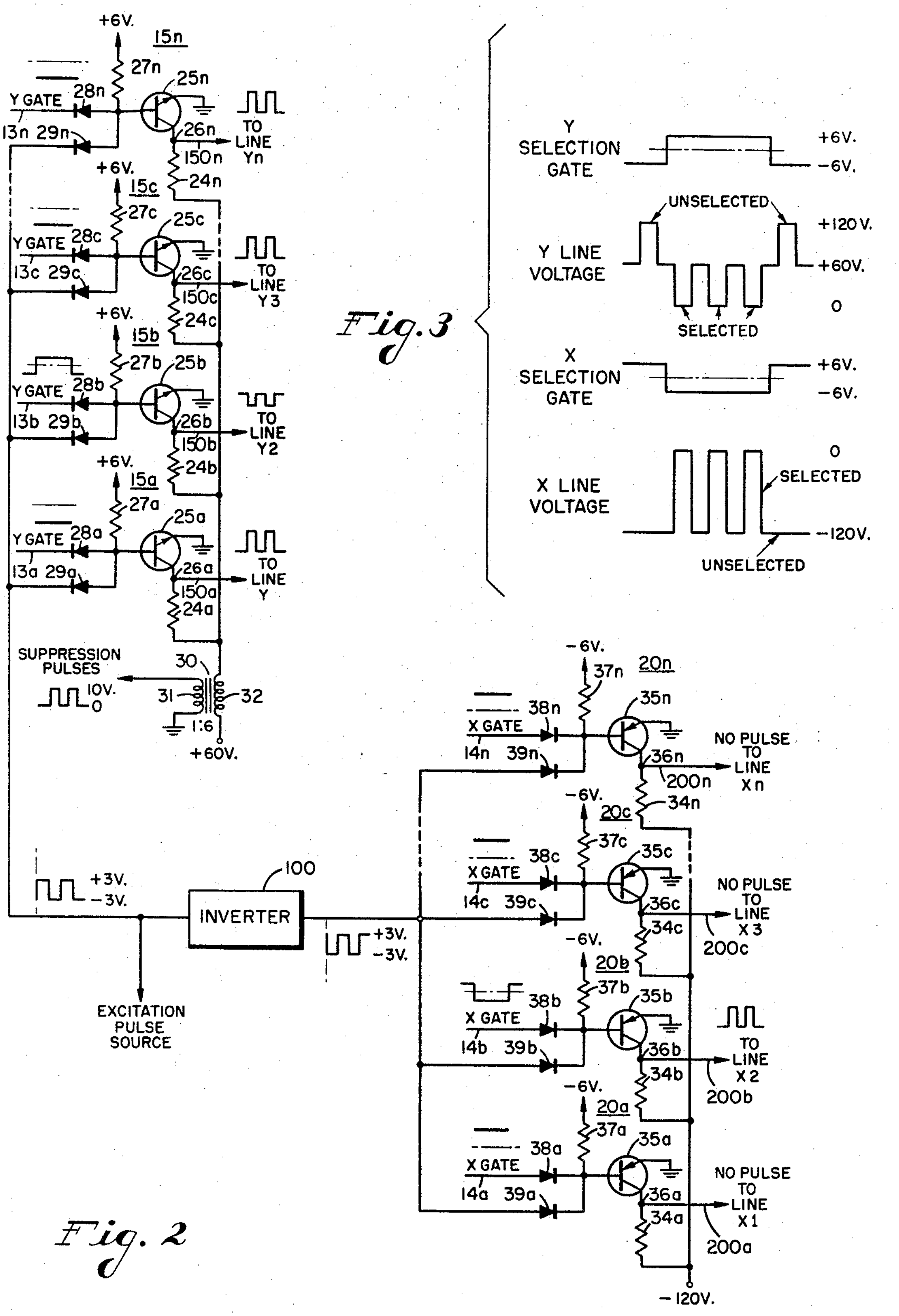
FIG. 2 is a schematic diagram of the first embodiment of the invention.
FIG. 3 are waveforms illustrating the operation of the circuit shown in FIG. 2.

Referring to FIG. 2 of the drawings, a first embodiment of the invention is shown. The base of each of the N–P–N transistors 25*a* to 25*n* of respective Y line drivers 15*a* to 15*n* is connected by way of a corresponding one of resistors 27*a* to 27*n* to a potential of 6 volts positive with respect to a reference such as ground. In the absence of a Y selection gating pulse, the cathode of diodes 28*a*, 28*c* and 28*n* is at approximately −6 volts and is forward biased. The potential at the base of transistors 25*a*, 25*c* and 25*n* then assumes a potential of about −5.5 volts, taking into account the voltage drop across the associated diodes, so that transistors 25*a*, 25*c* and 25*n* are biased off; these transistors, consequently, represent a high impedance. Diodes 29*a*, 29*c* and 29*n* are back biased owing to the −5.5 volts on their anodes; consequently, excitation pulses, which fluctuate between −3 volts and +3 volts relative to ground, are unable to pass respective diodes 29*a*, 29*c* and 29*n* and are prevented from reaching the base of transistors 25*a*, 25*c* and 25*n*. The collector load resistors 26*a*, 26*b* . . . 26*n* of transistors 25*a* to 25*n* are each connected in circuit with the secondary winding 32 of transformer 30. Suppression pulses, which fluctuate between 0-volts and +10 volts are supplied to the primary winding 31 of the suppression pulse transformer, thereby inducing a pulse of 60 volts in the secondary winding 32 thereof. Since the secondary winding is referenced to +60 volts and since the two windings 31 and 32 of the transformer 30 are wound in the same direction, the amplified suppression pulses appearing across winding 32 fluctuate between +60 volts and +120 volts. This pulsating voltage is available at points 26*a*, 26*c* and 26*n* of the collective circuits of respective transistors 25*a*, 25*c* and 25*n* when the transistors are cut off and is supplied to the corresponding horizontal lines Y1, Y3 and Y*n*. All unselected Y lines, therefore, carry a positive-going pulse of 60 volts.

When a Y selection gating pulse arrives at one of the Y line drivers, for example, driver 15*b*, the voltage at the cathode of diode 28*b* rises to +6 volts, thus back biasing diode 28*b*. Diode 29*b* is forward biased by the +6 volts on its anode and excitation pulses, fluctuating in level between −3 volts and +3 bolts, are supplied to the base of transistor 25*b*. As the amplitude of the excitation pulses rise from −3 volts to approximately +0.3 volt, transistor 25*b* is rendered conductive. As the level of the excitation pulses falls toward −3 volts, the transistor is switched off until the next pulse reaches a level of about 0.3 volt. Since the impedance represented by the transistor 25*b* becomes very small during conduction, its collector goes to substantially 0-volts or ground during conduction. As the excitation pulse swings negatively, the collector voltage approaches the direct current level of +60 volts at which one end of transformer winding 32 is maintained. The switching action of transistor 25*b* is also a negative-going pulse, which fluctuates between +60 volts and 0-volts, appearing at the corresponding vertical line Y2 of the electroluminescent panel 10. In other words, the selected Y line of the electroluminescent panel carries a negative-going pulse of 60 volts.

The bases of transistors 35a to 35n of the respective X line drivers 20a to 20n are connected by way of corresponding resistors 37a to 37n to a source of —6 volts, while the collector load resistors 34a to 34n are referenced to —120 volts. In the absence of an X selection gating pulse, the anode of diodes 38a, 38c and 38n are forward biased by the +6 volts supplied from the X line selection circuitry and the bases of respective P-N-P transistors 35a, 35c and 35n are at about +6 volts and transistors 35a, 35c and 35n are biased off. The excitation pulses from the excitation pulse source, which are inverted by inverter 100, cannot reach the bases of these transistors since corresponding diodes 39a, 39c and 39n are back biased by the approximately +6 volts on their cathodes. With transistors 35a, 35c and 35n nonconductive and with their collector load resistors 34a, 34c and 34n returned to a source of —120 volts, the output from points 36a, 36c and 36n in the collector circuits of respective transistors 35a, 35c and 35n remains at —120 volts. This steady voltage applied to X lines X1, X3 and Xn has no visible effect upon the materials of the electroluminescent panel 10.

When an X selection gating pulse is supplied, say, at the input to X line driver 20b, diode 38b is back biased by this —6 volt input. Consequently, diode 39b is forward biased and excitation pulses are permitted to pass diode 39b to the base of transistor 35b, thereby intermittently biasing transistor 35b in and out of conduction. During the conduction period, a positive-going pulsating voltage is derived at point 36b which rises from a level of —120 volts to 0 volts. This positive-going pulse of 120 volts is supplied to corresponding horizontal line X2 which, in the example given here, is the selected horziontal line.

As shown clearly in FIG. 3, the unselected Y line driver, that is the Y line driver is not receptive of a Y gating pulse, supplies a positive-going 60-volt pulse to the associated unselected Y lines, while the unselected X line drivers, that is the line drivers are not receptive of an X gating pulse, supply no pulses to their associate X lines. Consequently, the crossovers of the unselected X and Y lines have a peak potential difference of 60 volts; this potential is insufficient to cause luminescence at such crossover points. The selected Y line driver supplies a negative-going 60-volt pulse to the selected Y line Y2, while the selected X line driver supplies a positive-going 120-volt pulse to the selected line. Consequently, the crossover of the selected X and Y lines is subjected to a peak potential difference of 180 volts. This voltage is sufficient to illuminate the selected crossover point.

It should be noted that the crossover points of the selected X line and the unselected Y lines are not illuminated, since the unselected Y lines receive a positive-going potential of 60 volts; whereas, the selected X line reecives a positive-going potential of 120 volts. The net voltage, therefore, is only 60 volts. Similarly, the crossovers of the selected Y line and unselected X lines will be at a potential equal to the difference between a negative 60-volt pulse and no pulse, or 60 volts. Again, the voltage is insufficient to produce luminescence. By means of applicant's invention, therefore, illumination of a bright spot at the intersection of two selected lines of the panel 10 is possible, while at the same time illumination is suppressed from occurring along the entire length of the selected X and Y lines.

Figures 4, 5:
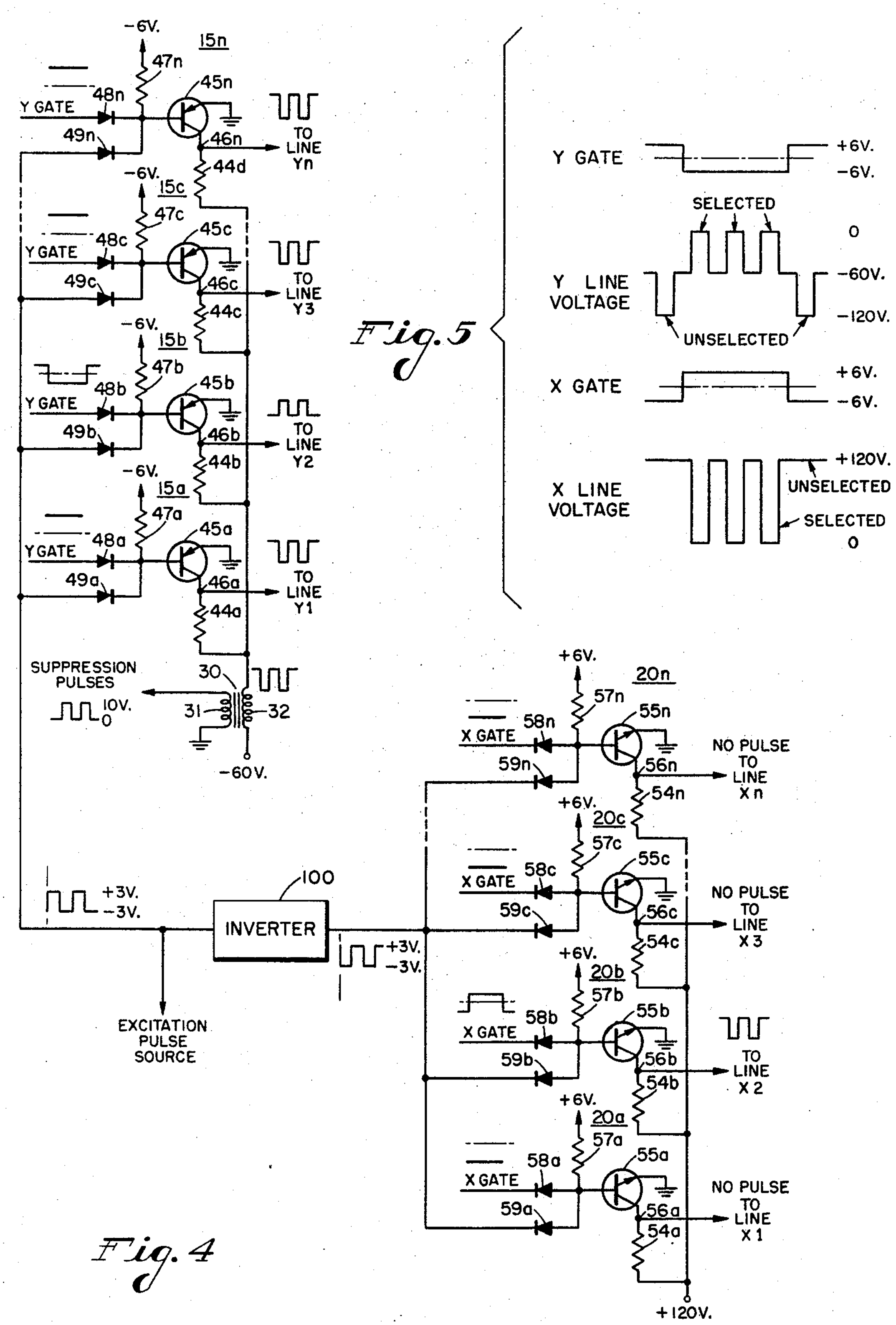
FIG. 4 is a schematic diagram showing a modification of the embodiment shown in FIG. 2.
FIG. 5 are waveforms showing the operation of the circuit of FIG. 4.

FIG. 4 discloses a modified version of the X and Y line driver circuitry of FIG. 2 which uses transistors of the P-N-P type for the Y line driver circuits 15a to 15n. In FIG. 4, the bases of the transistors 45a to 45n of the Y line drivers 15a to 15n are connected through base resistors 47a to 47n to a source of —6 volts. The collector load resistors 44a to 44n are connected to one end of the secondary winding 32 of transformer 30, while the other end of this secondary winding is connected to —60 volts. The primary and secondary windings of transformer 30 are wound in opposite directions, unlike the transformer of FIG. 2, so that the positive-going 10 volt suppression pulses supplied to the transformer induce in the secondary winding negative pulses fluctuating from —60 volts to —120 volts. The Y selection circuitry is reversed so as to supply normally +6 volts over lines 13a, 13c and 13n to the diodes 48a, 48c and 48n of the respective Y line drivers, 15a, 15c and 15n. The Y selection gate in the modification of FIG. 4 is a negative-going 6-volt pulse, as shown in FIG. 5, in contrast with the positive-going 6-volt gating pulse used in the device of FIG. 2. The diodes 48a, 48C and 48n, during the absence of a Y gating pulse, are forward biased, whereupon the bases of respective transistors 45a, 45c and 45n are brought to a potential of approximately +6 volts. In addition to cutting off these transistors, the +6 volts at the bases of these transistors reverse biases diodes 49a, 49C and 49n and prevents application of excitation pulses to the bases of corresponding transistors 45a, 45c and 45n. The suppression pulses thus appear at points 46a, 46c and 46n and the vertical lines Y1, Y3 and Yn receive a negative-going pulse fluctuating between —60 volts and —120 volts, as indicated in FIG. 5.

If line Y2 is to be selected, a Y selection gate is applied over line 13b to Y line driver 15b, thus back biasing diode 48b. The —.3 volt at the base of transistor 45b now forward biases diode 49b to allow excitation pulses to reach the base of transistor 45b and alternately switch on and off this transistor, in a manner already described in connection with the circuit of FIG. 2. The output voltage at point 46b in the collector circuit of transistor 15b fluctuates from —60 volts to 0 volt.

The X drive circuitry of FIG. 4, unlike that of FIG. 2, utilizes N-P-N transistors 55a to 55n in the X line drivers 20a to 20n. The bases of transistors 55a to 55n are connected by way of resistors 57a to 57n to a source +6 volts, while the collector load resistors 54a to 54n are connected to a source of +120 volts. In the example shown in FIG. 4, diodes 58a, 58c and 58n are forward biased by the —6 volts supplied thereto over lines 14a, 14c and 14n, respectively. This places a negative voltage on the anode of diodes 59a, 59c and 59n, thereby isolating the excitation pulses from the corresponding transistors 55a, 55c and 55n. Since these transistors are cut off, the outputs from points 56a, 56c and 56n of the collector circuits consist only of a steady voltage of +120 volts. The positive gate applied to X line driver 20b precludes the back biasing of diode 59b and permits excitation pulses to switch transistor 55b on and off. The output from point 56b then in a negative-going pulse fluctuating between 120 volts and 0 volts.

As shown in FIG. 5, during the absence of an X or Y selection gate, the unselected Y lines will carry a negative pulse of 60 volts and the unselected X lines will carry no pulse. The voltage differential at the crossovers of the unselected X and Y lines, therefore, will be 60 volts and will be insufficient to produce illuminescence. The crossover of a selected Y line and a selected X line will be maintained at the voltage differential between a positive 60 volt pulse and a negative 120 volt pulse, or at 180 volts. This potential is sufficient to cause luminescence. At the crossover of an X selected line and an unselected Y line, the voltage at these X and Y lines will be a negative 120 volt pulse and a negative 60 volt pulse, respectively. The voltage differential is 60 volts and is insufficient for luminescence. Similarly, there will be no luminescence at the crossovers of a selected Y line and unselected X lines since the voltages at these X and Y lines will be a positive 60 volt pulse and no volt pulse, respectively. The same effect is obtained at the crossovers of a selected X line and unselected Y lines since the voltages at the X lines will be a negative 120 volt pulse and the voltage at the unselected Y lines will carry a negative 60 volt pulse.

Figures 6, 7:
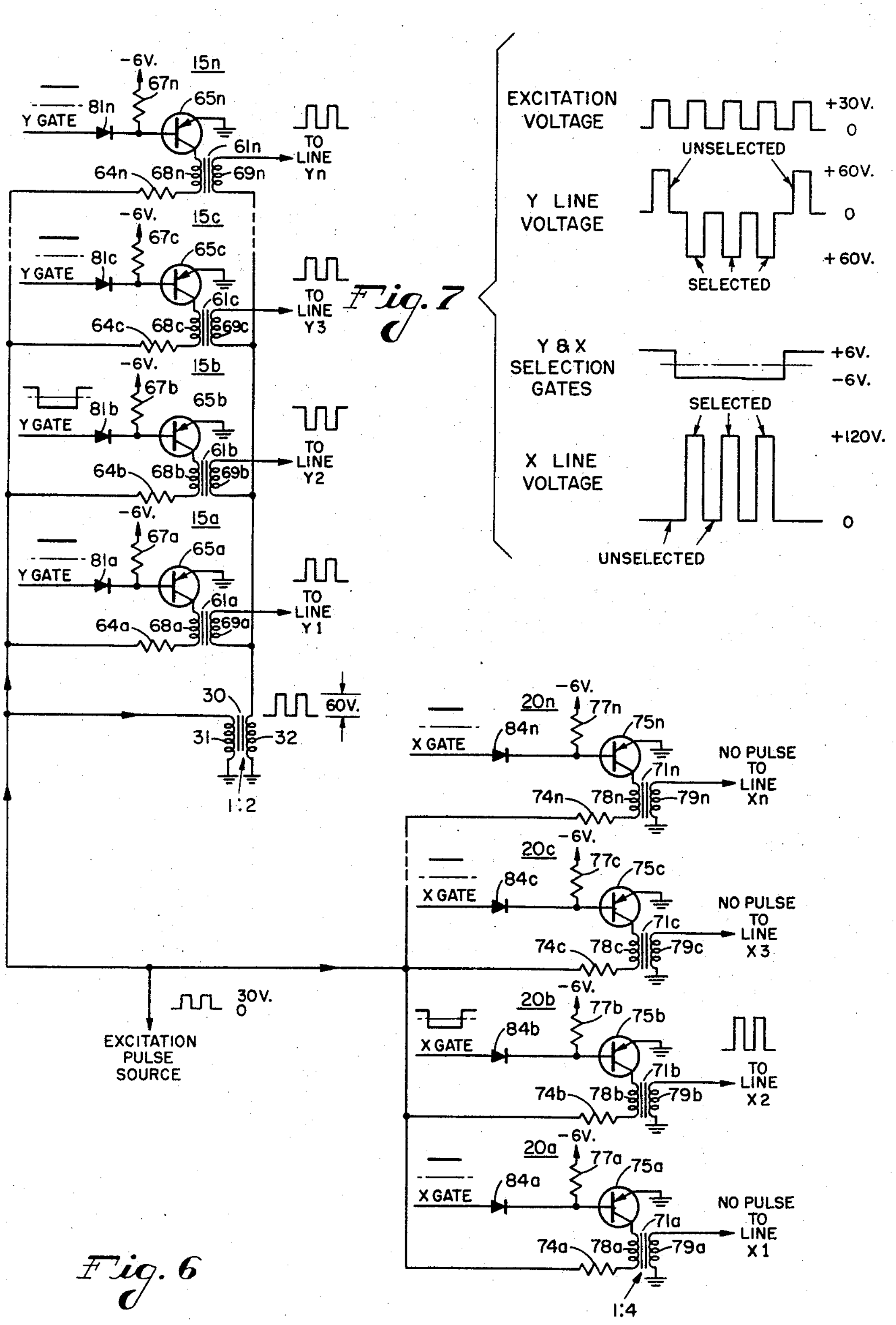
FIG. 6 is a schematic diagram of a further embodiment of the invention.
FIG. 7 are waveforms illustrating the operation of the circuit shown in FIG. 6.

A further embodiment of the invention is shown in FIG. 6 which has the advantage over the circuits of FIGS. 2 and 4 in avoiding the use of a 120 volt transistor. This circuit of FIG. 6, however, requires the use of transformers for each transistor in addition to the suppression transformer common to all Y line drivers. Although the excitation pulses applied to the various transistors of the Y line drivers 15a to 15n are applied also to the primary of the suppression transformer 30, it is evident that transformer 30 effectively serves as a suppression transformer for supplying suppression pulses similar to those used in transformer 30 of FIG. 2. The transformers 61a to 61n will be referred to as excitation transformers and the transformer 30 as a suppression transformer. Excitation pulses shown, by way of example, have positive-going pulses of 30 volts peak level, are supplied to the P-N-P transistors 65a to 65n of respective Y line drivers 15a to 15n by way of collector load resistors 64a to 64n and the respective primary winding 68a to 68n of excitation transformers 61a to 61n. The excitation pulses, as previously mentioned, further may be applied to the primary winding 31 of suppression transformer 30. It is possible, of course, to use a separate suppression pulse source; however, the excitation pulses serve adequately provided the voltage obtained at the step-up transformer 30 is a positive-going 60 volt pulse. Since the excitation pulses are 30-volt positive pulses, a step-up transformer 30 with a 1 to 2 turns ratio and identical winding direction in primary and secondary will supply the desired positive-going 60 volt suppression pulses. The secondary winding 32 of suppression transformer 30 is in series with each of the secondary or output windings 69a to 69n of the respective transformers 61a to 61n.

With no Y selection gate at the input to Y line drivers 15a, 15c and 15n, +6 volts is supplied to the anode of diodes 81a, 81c and 81n so that these diodes are conducting. The P-N-P transistors 65a, 65c and 65n, therefore, are normally biased off by this +6 volt input to the bases of these transistors. These transistors thus represent a high impedance, particularly as compared with the impedance of the primary transformer windings 68a, 68c and 68n. Consequently, most of the excitation voltage applied to transformers 61a, 61c and 61n appears across the respective transistors 65a, 65c and 65n and substantially no excitation voltage exists across the primary windings 68a, 68c and 68n. The voltage induced in secondary windings 69a, 69c and 69n of these transformers is substantially negligible. The net voltage available at the output lines 150a, 150c and 150n of the Y line drivers 15a, 15c and 15n is the algebraic sum of the zero volts induced in the secondary windings 69a, 69c and 69n and the +60 volt pulses induced in the common secondary winding 32 in series therewith. This net voltage, therefore, is a positive-going 60 volt pulse which is supplied to the respective vertical lines Y1, Y3 and Yn.

Upon arrival of a Y selection gate, the anode of diode 81b in Y driver circuit 15b is placed at −6 volts and is reversed biased. The transistor 15b is driven to saturation by this negative gating pulse and effectively presents a short circuit in series with the primary windings 68b. Consequently, substantially the entire excitation voltage (30 volts) appears across the primary winding 68b of the excitation transformer 61b. Transformer 61b has a step-up ratio of 1:4 and, inasmuch as the primary and secondary windings are wound oppositely, a negative-going 120 volt pulse is induced in the secondary winding 69b of excitation transformer 61b owing to the negative-going 30-volt pulse supplied to the primary winding 68b thereof. In addition, secondary winding 32 of suppression transformer 30 has induced therein a 60-volt positive pulse. The negative 120-volt pulse in winding 69b in series with the 60-volt pulse in winding 32 provides a net output pulse of −60 volts on line 150b of Y line drive 15b. This negative 60-volt pulse is applied to the corresponding selected vertical line Y2 of electroluminescent panel 10.

The X line drivers 28a to 28n in the device of FIG. 6 also have transformers 71a to 71n, respectively, associated therewith. The transformers 71a to 71n receive excitation pulses which may be identical to those supplied to the Y line drivers 15a to 15n. The X line drivers 20a to 20n include respective P-N-P transistors 71a to 71n, the bases of which are biased to −6 volts through respective base resistors 77a to 77n. The collector circuit for each of the transistors 75a to 75n includes the primary windings 78a to 78n of 1:4 step-up transformers 71a to 71n and load resistors 74a to 74n, all respectively. The excitation pulses are supplied to the collector of transistors 75a to 75n through collector load resistors 74a to 74n and the primary windings 78a to 78n, all respectively. The secondary windings 79a to 79n provide the respective output voltages to the various X lines of the electro-luminescent panel 10. The primary and secondary windings of transformers 71a to 71n are wound to obtain the same polarity of both primary and secondary. Consequently, if positive excitation pulses of 30 volts are supplied to the primary windings of transformers 71a to 71n, positive pulses of 120 volts are induced in the secondary windings 79a to 79n of the transformers, when a particular X transistor is selected by the gate.

With no X selection gate, 6 volts are supplied to diodes 84a, 84c and 84n; these diodes are forward biased and the P-N-P transistors 75a, 75c and 75n are biased off by the +6 volts supplied by way of the diodes 84a . . . to the transistor base. Consequently, the impedance of each of transistors 75a, 75c and 75n is quite high and substantially all of the 30 volt excitation voltage appears across the respective transistors, with very little of this voltage appearing across the corresponding primary windings 78a, 78c and 78n. There is, therefore, substantially zero voltage induced in the secondary windings 79a, 79c and 79n of transformers 71a, 71c and 71n and the X output voltage is zero.

Upon arrival of an X selection gate, the anode of diode 84b is supplied with −6 volts. This gate back biases diode 84b and removes the positive voltage at the base of transistor 75b. The transistor 75b thereby is biased to saturation and represents a very low impedance in series with the primary winding 78b of transformer 71b. Substantially all of the excitation voltage (+30 volts) thus appears across the primary winding 78b of transformer 71b. Since the step-up voltage ratio of transformer 71b is 1:4, positive pulses of 120 volts are induced in the secondary 79b. These positive pulses are supplied to the corresponding vertical line X2 of the electro-luminescent panel 10.

As shown clearly in FIG. 7, the +60 volt pulses applied to the unselected Y lines of the electroluminescent panel and zero voltage at the unselected X lines produce a resultant voltage at the crossover of the unselected X and Y lines of 60 volts—a voltage insufficient to establish a visible glow. Similarly, at the crossover of a selected X line and an unselected Y line, positive-going pulses of 120 volts and 60 volts, respectively, occur. Moreover, at the crossover of an unselected X line and a selected Y line, voltages of zero volts and negative 60 volts, respectively, occur. The resultant voltage in each of these two cases is only 60 volts and no visible glow can be established. It is evident, therefore, that the voltage differential is sufficient to cause the visible glow only at the crossover of the selected X and Y lines. At this crossover point, the voltage differential between the respective positive 120 volt and negative 60 volt pulses is 180 volts.

Figures 8, 9:
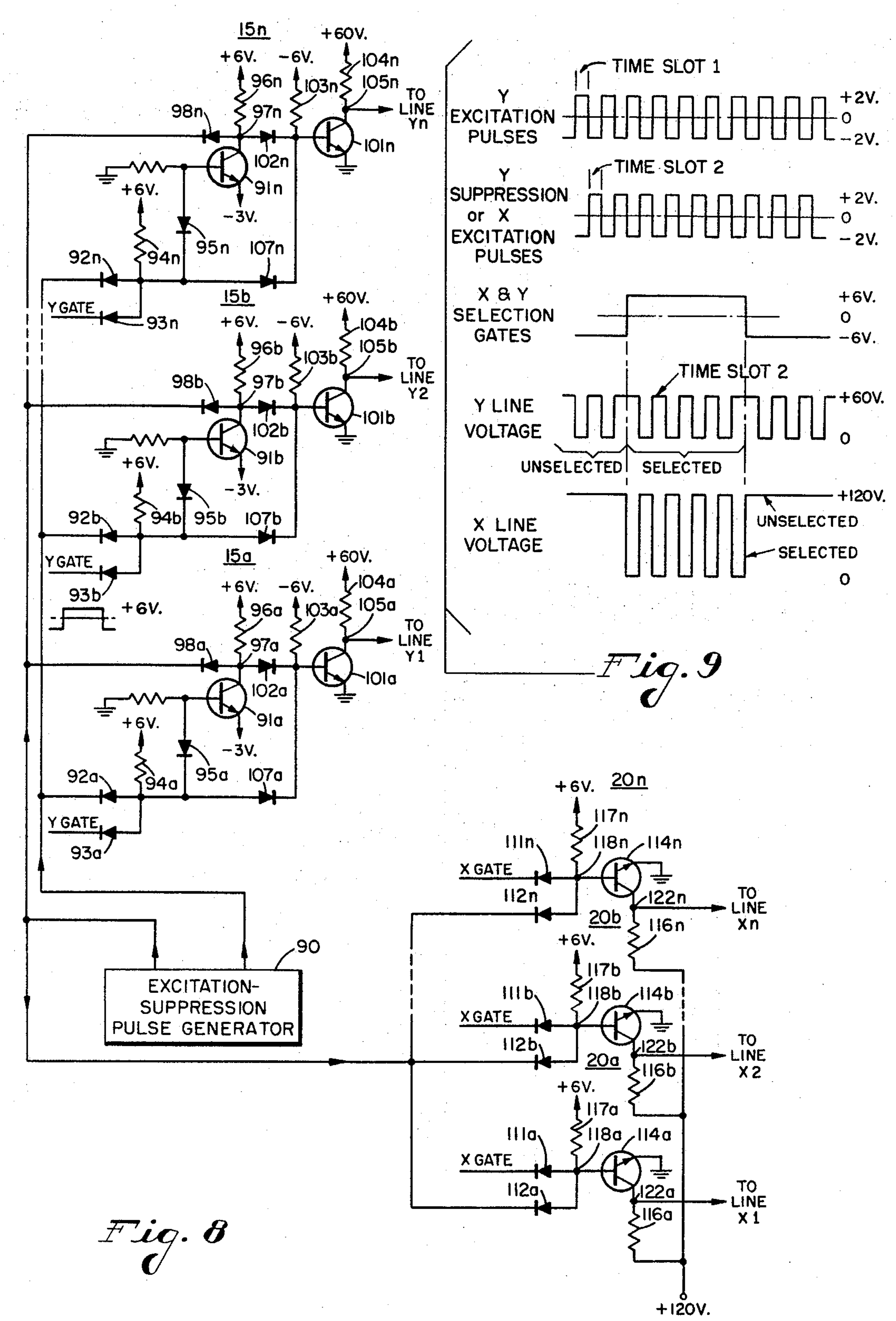
FIG. 8 is a schematic diagram of still another embodiment of the invention.
FIG. 9 are waveforms explaining the operation of the circuit shown in FIG. 8.

A further modification of the invention is shown in FIG. 8 which differs from those previously described principally in that pulses of like polarity, but not in time coincidence, are supplied to the selected X and Y line drivers during the selection gating period, whereas the remaining or unselected Y line driver and the selected X line driver produce pulses of like polarity which are in coincidence. The Y line drivers 15a to 15n are supplied with non-coincidence suppression pulses and excitation pulses which, for example, may be produced at opposite terminals of a conventional multivibrator 90 and thus occur in alternate time slots. The resultant Y suppression and excitation waveforms then are as indicated in FIG. 9. The Y suppression pulses also may be used as X excitation pulses for the X line drivers 20*a* to 20*n*, so that the X and Y excitation pulses occupy alternate time slots, also as shown in FIG. 9. For the sake of illustration, X and Y line drivers 20*b* and 15*b* are illustrated as being receptive of selection gating pulses in order to select lines X2 and Y2, respectively.

The Y line drivers 15*a* to 15*n* include a pair of N-P-N transistors 91*a* to 91*n* and 101*a* to 101*n*. The Y excitation pulses are supplied to diodes 92*a* to 92*n* of respective Y line drivers 15*a* to 15*n*. The output of the Y selection circuitry for each of the Y line drivers 15*a* to 15*n* is supplied to diodes 93*a* to 93*n*, respectively. The anodes of diodes 92 . . . and 93 . . . are connected through corresponding resistors 94*a* to 94*n* to a source of +6 volts. Normally, that is, during the absence of a Y gate pulse, the −6 volts at the cathode of diodes 93*a* and 93*n* renders these diodes conductive, thereby overcoming the positive voltage at the anode of diodes 92*a* and 92*n*. The cathode of diodes 95*a* and 95*n* in the base circuit of transistors 91*a* and 91*n* also attains a potential of about −6 volts. Since diodes 92*a* and 92*n* are back biased, the Y excitation pulses cannot pass therethrough. Moreover, since diodes 95*a* and 95*n* are forward biased by the negative volts at the cathode, the bases of transistors 91*a* and 91*n* assume a negative potential of the order of 6 volts. Transistors 91*a* and 91*n*, consequently, are cut off; this means that there is no voltage drop owing to current flow in the collector resistors 96*a* and 96*n* due to conduction in the transistors. The potential at junction points 97*a* and 97*n* is at +6 volts. The suppression pulses are applied to diodes 98*a* to 98*n*. Since diodes 98*a* and 98*n*, as well as 102*a* and 102*n*, are forward biased by the positive voltage at points 97*a* and 97*n*, a suppression pulse is passed therethrough and reaches the bases of grounded emitter transistors 101*a* and 101*n*. The bases of these transistors are connected to a source of −6 volts by way of resistors 103*a* to 103*n*, respectively, while their collectors are connected to a source of +60 volts through collector load resistors 104*a* and 104*n*, respectively.

The suppression pulses applied to the bases of transistors 101*a* and 101*n* cause these transistors to be switched alternately into and out of conduction during the time interval corresponding to that of the suppression pulses. In other words, the output at points 105*a* and 105*n* fluctuates between 60 volts and zero during the time slots occupied by the Y suppression pulses. This time period is indicated as $t_2$ in FIG. 9. It should be noted that diodes 107*a* and 107*n* are back biased during this period $t_2$ and thus prevent application of excitation pulses to the input circuit of respective transistors 101*a* and 101*n*.

During the period of occurrence of a Y selection gate, +6 volts is applied to the diode 93*b* of Y line driver 15*b*. Diode 93*b* is back biased and no negative voltage is permitted to overcome the positive voltage at the anodes of diodes 92*b* and 107*b* and the cathode of diode 95*b*. Therefore, diodes 92*b* and 107*b* are forward biased and permit excitation pulses to pass to the base of corresponding transistor 101*b*. Since diode 95*b* is back biased, the excitation pulse and gate pulse cannot reach the base of transistor 91*b*. Transistor 91*b* is conducting and the voltage drop in collector resistor 96*b* causes the voltage at 97*b* to drop from the level of 6 volts to a point sufficiently negative to back bias 98*b* and 102*b*. Suppression pulses, hence, are unable to reach the input circuit of transistor 101*b*. As previously stated, the excitation pulses reaching the base of transistor 101*b* by way of diodes 92*b* and 107*b* cause transistor 101*b* to be switched into and out of conduction to produce output pulses at point 105*b* which fluctuate from +60 volts to zero, during the time period occupied by the Y excitation pulses. This time period is indicated in FIG. 9 as $t_1$.

The Y suppression pulses also may be used as excitation pulses for the X line drivers and are supplied to diodes 112*a*, 112*b* and 112*n* of respective X line drivers 20*a*, 20*b* and 20*n*. It should be understood that the Y suppression pulses are, in fact, excitation pulses, when supplied to the X line drivers. The output from the X line selection circuitry is supplied to diodes 111*a*, 111*b* and 111*n* of these drivers. The X line drivers also comprise N-P-N transistors 114*a*, 114*b* and 114*n* having respective collector resistors 116*a*, 116*b* and 116*n* maintained at 120 volts positive relative to the grounded emitters. The bases of the transistors 114*a*, 114*b* and 114*n* are connected through respective resistors 117*a*, 117*b* and 11*n* to +6 volts. Normally, that is, in the absence of an X selection gate, the diodes 111*a* and 111*n* are forward biased by the −6 volts at the cathodes. This places points 118*a* and 118*n* at approximately −6 volts and back biases diodes 112*a* and 112*n*. This prevents passage of the X excitation (Y suppression) pulses to transistors 114*a* and 114*n*. Moreover, the negative voltage at points 118*a* and 118*n* biases off transistors 114*a* and 114*n*. The output at points 122*a* and 122*n* consists of a steady voltage of +120 volts.

When an X selection gate of +6 volts is applied to diode 111*b* of X line driver 20*b*, this diode is back biased and the potential at point 118*b* is controlled by excitation pulses supplied by way of diode 112*b*. This potential forward biases dode 112*b* and permits passage of X excitation pulses during time slot $t_2$ to reach the base of transistor 114*b*. These excitation pulses alternately switch transistor 114*b* into and out of conduction to provide pulses at 122*b* fluctuating between +120 volts and zero during the time slot occupied by the X excitation pulses. This time slot is indicated in FIG. 9 at $t_2$.

As indicated in FIG. 9, the voltage at unselected Y line is a negative 60 volt pulse occurring during time slot $t_2$; at this time the unselected X lines carry no pulse. Consequently, the voltage differential at the crossover of unselected X and Y lines is 60 volts—an amount insufficient to establish the electroluminescence. The voltage at a selected Y line is a negative 60 volt pulse occurring time slot $t_1$; during this time, the unselected X lines carry no pulse. Hence, the voltage differential at the crossovers of a selected Y line and unselected X lines is 60 volts—again insufficient for electroluminescence. The voltage at a selected X line is a negative 120 volt pulse occurring during time slot $t_2$. Hence, the net voltage at the crossovers, of a selected X line and unselected Y lines is a 60 volt negative pulse. Only at the crossover of selected X and Y lines is the net voltage sufficient to cause electroluminescence. In this case, the selected X line driver produces a negative 120 volt pulse at time slot $t_2$, while the selected Y line driver produces a negative-going pulse of 60 volts at time slot $t_1$. Since the negative-going edges of the 120 volt X line driver coincides with positive-going edges of the 60 volt Y line drive, the result is a voltage of 180 volts.

Although the suppression and excitation pulses each have been illustrated as symmetrical waves, that is, pulses of identical alternations, it is possible to generate excitation and suppression pulses having a duty cycle greater than 0.5. In such cases, it is essential, of course, that the leading edges of the suppression pulses coincide substantially with the trailing edges of the excitation pulses, or vice versa.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A two-dimensional display system comprising an electroluminescent panel including an array of first spaced lines extending in a first direction and an array of spaced second lines extending in a second direction, each of said first lines crossing said second lines to form a plurality of crossover points, and a layer of electroluminescent material disposed between said arrays of lines, a plurality of first drivers each coupled to a corresponding one of said first lines, a plurality of second drivers each coupled to a corresponding one of said second lines, first circuit means for selectively applying a first gating pulse to a selected one of said first drivers corresponding to the first line to be selected, second circuit means for selectively applying a second gating pulse to a selected one of said second drivers corresponding to the second line to be selected, each of said first drivers being normally productive of a first voltage output on said corresponding one of said first lines, each of said first line drivers being responsive to said first gating pulse for producing a second voltage output on said corresponding one of said first lines, each of said second line drivers being normally productive of a third voltage output on said corresponding one of said second lines, each of said second line drivers responsive to said second gating pulse to produce a fourth voltage output on said corresponding one of said second lines, said fourth voltage output and said first voltage output at the crossovers of a selected second line and unselected first lines produce a voltage differential which is below that necessary for establishing luminescence of said electroluminescent material, said second voltage output and said third voltage output at the crossovers of a selected first line and unselected second lines produce a voltage differential which is below that necessary for establishing luminescence of said electroluminescent material while said second voltage output and said fourth voltage output at the crossover of the selected first line and the selected second line produce a voltage differential necessary for establishing luminescence of said material thereat.

2. A two-dimensional display system comprising an electroluminescent panel including an array of first spaced lines extending in a first direction and an array of spaced second lines extending in a second direction, each of said first lines crossing said second lines to form a plurality of crossover points, and a layer of electroluminescent material disposed between said arrays of lines, a plurality of first drivers each coupled to a corresponding one of said first lines, a plurality of second drivers each coupled to a corresponding one of said second lines, first circuit means for selectively applying a first gating pulse to a selected one of said first drivers corresponding to the first line to be selected, second circuit means for selectively applying a second gating pulse to a selected one of said second drivers corresponding to the second line to be selected, said first drivers being normally nonconductive, said first line drivers being rendered conductive in response to said first gating pulse for producing first output positive pulses on said first line selected, said second line drivers being normally productive of second output positive pulses synchronous with said first pulses, said second line drivers being responsive to said second gating pulse to produce third output negative pulses synchronous with said first and second pulses, only said first and third pulses on the selected one of said first lines and the selected one of said second lines providing a voltage differential necessary for establishing luminescence of said material at the crossover of said first and second selected lines. Said third pulses providing a voltage differential at the crossovers of a selected second line and unselected first lines which is below that necessary for establishing luminescence of said electroluminescent material, said second output pulses and said first output pulses providing a voltage differential at the crossovers of a selected first line and unselected second lines which is below that necessary for establishing luminescence of said electroluminescent material.

3. A two-dimensional display system comprising an electroluminescent panel including an array of first spaced lines extending in a first direction and an array of spaced second lines extending in a second direction, each of said first lines crossing said second lines to form a plurality of crossover points, and a layer of electroluminescent material disposed between said arrays of lines, a plurality of first drivers each coupled to a corresponding one of said first lines, a plurality of second drivers each coupled to a corresponding one of said second lines, first circuit means for selectively applying a first gating pulse to a selected one of said first drivers corresponding to the first line to be selected, second circuit means for selectively supplying a second gating pulse to a selected one of said second drivers corresponding to the second line to be selected, said first drivers being normally productive of a steady state first output, said first line drivers being responsive to said first gating pulse for producing first output pulses of a given polarity, said second line drivers being normally productive of second output pulses of said given polarity, said second line drivers being responsive to said second gating pulse to produce third output pulses of a polarity opposite to said given polarity, said first, second and third output pulses being synchronous with each other, said third output pulses of said opposite polarity and said steady state first output providing a voltage differential at the crossovers of a selected second line and unselected second lines which is below that necessary for establishing luminescence of said electroluminescent material, said first output pulses of said given polarity and said second output pulses providing a voltage differential at the crossovers of a selected first line and unselected second lines which is below that necessary for establishing luminescence of said electroluminescent material while said second pulses and said third pulses provide a voltage differential in the crossover of the selected first line and the selected second line necessary for establishing luminescence of said electroluminescent material.

4. A two-dimensional display system comprising an electroluminescent panel including an array of first spaced lines extending in a first direction and an array of spaced second lines extending in a second direction, each of said first lines crossing said second lines to form a plurality of crossover points, and a layer of electroluminescent material disposed between said arrays of lines, a plurality of first drivers each coupled to a corresponding one of said first lines, a plurality of second drivers each coupled to a corresponding one of said second lines, first circuit means for selectively applying a first gating pulse to a selected one of said first drivers corresponding to the first line to be selected, second circuit means for selectively supplying a second gating pulse to a selected one of said second drivers corresponding to the second line to be selected, said first drivers being normally nonconductive and productive of a steady state first output, said first line drivers being rendered conductive in response to said first gating pulse for producing first output pulses of a given polarity in a first time slot, said second line drivers being normally nonconductive for producing second output pulses of said given polarity occurring within said first time slot, said second line drivers being rendered conductive in response to said second gating pulse to produce third output pulses occurring within a second time slot adjacent to said first time slot, said second output pulses of said first time slot and said steady state first output providing a voltage differential at the crossovers of an unselected second line and unselected first lines which is below that necessary for establishing luminescence of said electroluminescent material, said second output pulses of said first time slot and said first output pulses producing a voltage differential at the crossovers of a selected first line and unselected second lines which is below that necessary for establishing luminescence of said electroluminescent material said first output pulses and said third output pulses occurring at said adjacent first and second time slots producing a voltage differential at the crossover at a selected first line and a selected second line necessary for establishing luminescence of said material.

5. A two-dimensional display system comprising an electroluminescent panel including an array of first spaced lines extending in a first direction and an array of second spaced lines extending in a second direction, each of said first lines crossing said second lines to form a plurality of crossover points, and a layer of electroluminescent material disposed between said arrays of lines, a source of suppression pulses, a source of excitation pulses, a suppresion pulse transformer supplied with said suppression pulses, a plurality of first drivers each coupled to a corresponding one of said first lines, a plurality of second drivers each coupled to a corresponding one of said second lines, said second drivers each including a transistor having the output winding of said suppression pulse transformer in circuit therewith, excitation pulse transformers associated with said second drivers, the output winding of said suppression pulse transformer being in circuit with a corresponding line, first circuit means for selectively applying a first gating pulse to a selected one of said first drivers corresponding to the first line to be selected, second circuit means for selectively applying a second gating pulse to a selected one of said second drivers corresponding to the second line to be selected, the transistors of said first drivers normally being isolated from said excitation pulses whereby a steady state first output is produced, said first line driver being rendered conductive by said first gating pulse for transferring said excitation pulses to the corresponding transistor to produce first output pulses, the output circuits of the transistors of said second line drivers normally being at the potential induced in the output winding of the corresponding suppression pulse transformer whereby second output pulses of a given polarity are obtained, said second line drivers being rendered conductive in response to said second gating pulse for transferring said excitation pulses to the corresponding transistor for providing a pulsating voltage at said transistor which combines with the voltage across the output winding of said suppression pulse transformer to produce second output pulses of a polarity opposite to said given polarity, said second output pulses of said given polarity and said steady state first output providing a voltage differential at the crossovers of a selected second line and unselected first lines which is below that necessary for establishing luminescence of said electroluminescent material, said second output pulses of said given polarity and said first output pulses producing a voltage differential at the crossovers of a selected first line and unselected second lines which is below that necessary for establishing luminescence of said electroluminescent material said second output pulses of said polarity opposite to said given polarity and said first output pulses producing a voltage differential at the crossover of a selected first line and a selected second line necessary for establishing luminescence of said material.

6. A two-dimensional display system comprising an electroluminescent panel including an array of first spaced lines extending in a first direction and an array of second spaced lines extending in a second direction, each of said first lines crossing said second lines to form a plurality of crossover points, and a layer of electroluminescent material disposed between said arrays of lines, a source of excitation pulses, a plurality of excitation pulse transformers and a suppression pulse transformer each supplied with excitation pulses, a plurality of first drivers each coupled to a corresponding one of said first lines, a plurality of second drivers each coupled to a corresponding one of said second lines, said drivers each including a transistor having the input winding of said excitation pulse transformer in circuit therewith, said suppression pulse transformer output winding being in series with the output windings of the excitation pulse transformers associated with said second drivers, the output winding of said corresponding excitation pulse transformer being in circuit with a corresponding line, first circuit means for selectively applying a first gating pulse to a selected one of said first drivers corresponding to the first line to be selected, second circuit means for selectively applying a second gating pulse to a selected one of said second drivers corresponding to the second line to be selected, the transistors of said first drivers normally representing a high impedance in series with the input winding of the corresponding excitation pulse transformer whereby substantially zero voltage is induced in the output winding of the associated excitation pulse transformer and a steady state first output is produced, said first line driver being rendered conductive by said first gating pulse for transferring said excitation pulses to said excitation pulse transformer output winding to produce first output pulses, the transistors of said second line drivers normally representing a high impedance in series with the input winding of the corresponding excitation pulse transformer whereby substantially zero voltage is induced in the output winding of the associated excitation pulse transformer which combines with the voltage at the output winding of the suppression pulse transformer to produce second output pulses of a given polarity, said second line drivers being rendered conductive in response to said second gating pulse for transferring said excitation pulses to the corresponding excitation pulse transformer output winding which combines with the voltage across the output winding of said suppression pulse transformer to produce second output pulses of a polarity opposite to said given polarity, said second output pulses of said opposite polarity and said steady state first output providing a voltage differential at the crossovers of a selected second line and unselected first lines which is below that necessary for establishing luminescence of said electroluminescent material, said second output pulses of said given polarity and said first output pulses producing a voltage differential at the crossovers of a selected first line and unselected second lines which is below that necessary for establishing luminescence of said electroluminescent material said first output pulse and said second output pulse opposite polarity producing a voltage differential at the crossover of a selected first line and a selected second line necessary for establishing luminescence of said material, said first output pulse and said second output pulse opposite polarity producing a voltage differential at the crossover of a selected first line and a selected second line necessary for establishing luminescence of said material.

7. A two-dimensional display system comprising an electroluminescent panel including an array of first spaced lines extending in a first direction and an array of second spaced lines extending in a second direction, each of said first lines lines crossing said second lines to form a plurality of crossover points, and a layer of electroluminescent material disposed between said arrays of lines, means for generating excitation pulses in a first time slot, means for generating suppression pulses in a second time slot adjacent to said first time slot suppression pulses occupying different first and second time slots, a plurality of first drivers each coupled to a corresponding one of said first lines, a plurality of second drivers each coupled to a corresponding one of said second lines, said drivers each including a transistor normally isolated from said suppression pulses and in a cut-off condition, so that a steady state first output is derived, first circuit means for selectively applying a first gating pulse to a selected one of said first drivers corresponding to the first line to be selected, second circuit means for selectively applying a second gating pulse to a selected one of said second drivers corresponding to the second line to be selected, the transistor of said first line driver being rendered conductive by said first gating pulse for transferring said suppression pulses to said transistor for producing a first output pulse at said second time slot during conduction of said transistor, the transistors of said second line drivers normally being isolated from said excitation pulses and rendered conductive in response to said suppression pulses to produce second output pulses at said second time slot, the transistor of said selected second line driver being rendered conductive in response to said excitation pulses during the period of said second gating pulse to produce second output pulses at said first time slot, said second output pulses at said second time slot and said steady state first output providing a voltage differential at the crossovers of a selected second line and unselected first lines which is below that necessary for establishing luminescence of said electroluminescent material, said second output pulses at said first time slot and said first output pulses at said second time slot producing a voltage differential at the crossovers of a selected first line and unselected second lines which is below that necessary for establishing luminescence of said electroluminescent material said first output pulses and said second output pulses occurring in said second time slots producing a voltage differential at the crossover at the selected first line and the selected second line necessary for establishing luminescence of said material.

References Cited

UNITED STATES PATENTS

| | | | |
|---|---|---|---|
| 2,995,682 | 8/1961 | Livingston ---------- | 340—166 |
| 3,043,961 | 7/1962 | Kazan ------------- | 250—213 |
| 3,157,822 | 11/1964 | Haskell ------------ | 315—169 |

OTHER REFERENCES

Greenberg, "Electroluminescent Display and Logic Devices," March 24, 1961, Electronics, pp. 31–35.

NEIL C. READ, *Primary Examiner.*

A. J. KASPER, *Assistant Examiner.*